June 9, 1936.  P. D. FFIELD  2,043,952
PROCESS OF WELDING MATERIAL
Filed Oct. 17, 1931
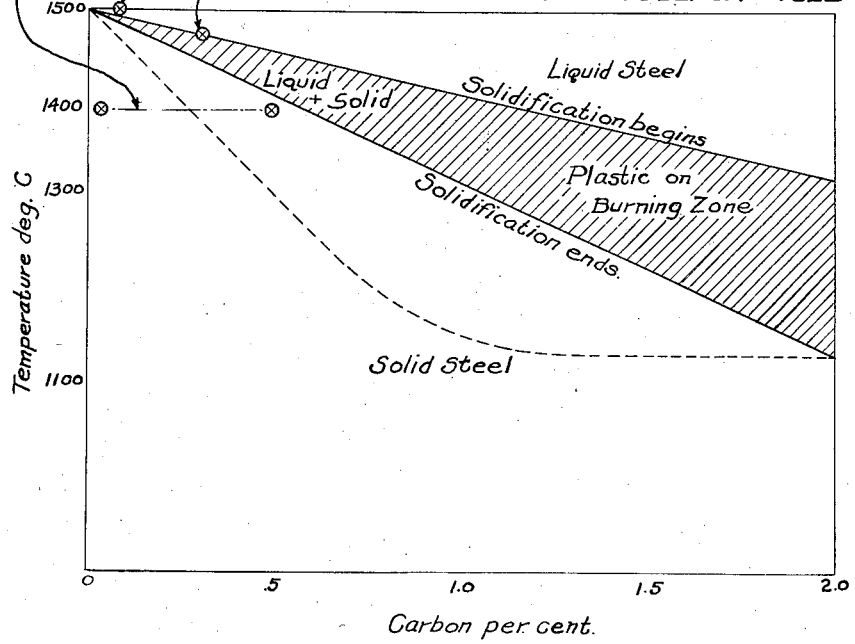
Fig. 4.
Fig. 1.
Before welding
Fig. 2.
After welding with ordinary rod.
Fig. 3.
After welding with low melting point rod
Inventor
Paul D. Ffield
By
Attorney Patented June 9, 1936

2,043,952

UNITED STATES PATENT OFFICE 2,043,952

PROCESS OF WELDING MATERIAL

Paul D. Ffield, Akron, Ohio, assignor to Goodyear-Zeppelin Corporation, Akron, Ohio, a corporation of Delaware Application October 17, 1931, Serial No. 569,426

5 Claims. (Cl. 113—112)

This invention relates to the art of welding, and has particular reference to the welding of alloy steels, such as chrome molybdenum steel, and the like.

Heretofore serious objections have been encountered in welding steels, and particularly chrome molybdenum steel, and it has been found that these objections are primarily due to the difficulties in perfecting a complete fusion of the metals without burning the base metal, especially when welding thin sections. The burning of the base metal, which is essentially a partial oxidation of the grains comprising the metal, results in a very poor and unsatisfactory weld, which is very apt to crack upon cooling and which is relatively weak and unfitted for structural use. Once the base metal has been burned, it is impossible to restore it to its original condition either by heat treatment or otherwise. Again, considerable skill has been required in former welding operations and it has been necessary to employ experienced workmen who had to be given plenty of time on each weld.

It is an object of the present invention to avoid and overcome the difficulties heretofore encountered in welding chrome molybdenum steel by the provision of a process which will make possible a very strong and efficient weld in this material without burning.

Another object of the invention is to provide a practical, inexpensive, and rapid method of welding alloy steel which does not necessitate such highly skilled operators.

Another object of the invention is to provide a process for welding metal, in which the metals can be joined without burning of the base metal.

Another object of the invention is to provide a process of welding chrome molybdenum steel, or steel possessing similar characteristics, wherein a welding rod of austenitic nickel steel is employed, which has a melting point lower than the burning zone of the chrome molybdenum or similar steel.

Another object of the invention is to reduce scaling and warping of welded pieces by lowering the welding temperatures.

For a better understanding of the invention reference may now be had to the accompanying drawing (taken from "Metalography and Heat Treatment of Iron and Steel" by A. Sauveur), wherein the single figure illustrates in graphical form the relation of the carbon content to the solid, plastic, and liquid temperatures of steel.

As illustrated in the accompanying drawing, the carbon content of steel, expressed in percentage, has a very definite relation to the temperatures at which the steel becomes either plastic or liquid. As the carbon content increases, the temperature necessary to render plastic and to melt the steel decreases. The graph, moreover, illustrates that steel, in changing from a solid to its molten state, passes through a plastic stage or zone, the temperature range of which increases with the carbon content. It has been found that, while the steel is in this plastic stage, thermal stresses are very likely to distort or move the grains of the steel so that they slip on each other, allowing the atmosphere to come in contact with the inside of the steel, as well as the outside. The ensuing results are then the same on the surfaces of the grains on the inside of the steel body as on the outside surface of the steel body. The oxygen from the atmosphere combines with carbon in the steel, forming $CO_2$ and leaving an oxide film on the grains within the steel similar to the scale which is usually found on the surface of the metal. It is this reaction which results in burning, and steel in this condition is considerably weakened and is incapable of restoration. Subsequent stresses set up in cooling or otherwise will ofttimes exert sufficient strain to break or crack the steel where it has been burned.

The usual practice in welding steel, and particularly chrome molybdenum steel, has been to employ a steel welding rod with a carbon content of approximately .06 percent, and with a melting point of approximately 1500° C. as illustrated on the graph. Thus it will be seen that in the ordinary welding operation, before the welding rod of .06 carbon steel melts, the base metal itself will have passed through the plastic state so that there is a possibility of burning in the manner above described especially in the light gages of material.

According to the present invention, a welding rod is employed having a melting point lower than that of the base metal being welded, so that the welding rod will melt and flow over the base metal before the base metal itself becomes plastic. Thereafter, as the base metal softens and becomes plastic, the molten metal of the welding rod will run into and fill any crevices which might be formed by distortion of the metallic grains, precluding air from entering the crevices and thus preventing burning of the base metal. It has been found that one way to practice the present invention is first to heat the base metal to a temperature just below its melting point, and thereafter to apply the welding rod, which, due to its lower melting point, will flow readily over the base metal and exclude the atmosphere from contact with the base metal.

In the drawing Fig. 1 shows a cross section of two sheets of steel before welding. Fig. 2 shows a cross section of an ordinary weld joining two sheets of steel. Fig. 3 shows two sheets of steel joined by a weld produced according to the method of this invention. Fig. 4 is a graph indicating the relative melting points of two different kinds of steel. It will be observed that in the ordinary welding process the base metal is melted to a considerable extent and the weld is formed of this melted steel and molten metal from the welding rod. As contrasted with this in the weld produced by the process of this invention only slight melting occurs on the corners of the base metal. The welding rod melts and flows over the base metal before the base metal itself becomes plastic.

In employing the above described method in welding chrome molybdenum steel, for which it is particularly adapted, it has been found that the best results are obtained by using welding rods of the austenitic nickel steels of the 18 Cr 8 Ni series, which are popularly known as stainless steel. These steels have a relatively low melting point, as indicated upon the accompanying graph, Fig. 4, and moreover, have a comparatively high tensile strength which is somewhat better than 100,000 pounds per square inch. As a result it has been found that welds produced by this new method can be made as strong as, or stronger than the original metal. As a matter of fact it has been found that gas welds made up in thin sections of chrome molybdenum steel by former methods have resulted in an average tensile strength of approximately 25% to 50% of the strength of the base metal due to local burning of the thin sections adjacent the weld, whereas the welds produced by the present invention have a tensile strength substantially equal to that of the base metal when the welded piece is subjected to commercial heat treatment or tempering within the limits generally employed in air craft welding operations. Burning is practically eliminated or at least reduced to a minimum, and due to the nature of the weld it is possible to place considerably more weld metal on a joint and to better advantage than has heretofore been possible in welding metals of this type. Again the skill and time necessary to produce a weld by the method embodying the present invention has been materially reduced from that formerly required. It has also been found that the present method can be employed on thinner plates, smaller pieces etc., due to the fact that less heat is used, which reduces warping and buckling as well as burning.

It will be appreciated, that while the invention is particularly adapted to weld chrome molybdenum steel, it is not necessarily limited thereto, but is more or less broadly applicable to welding metals of substantially all characteristics as long as the basic principles of the invention are employed. The present invention is adapted for use with either gas or electric welding and good results have been achieved in both types of welding.

Although I have illustrated and described only the preferred manner in which the invention may be practiced, and have described that method in detail, it will be apparent to those skilled in the art that the invention is not so limited but that various modifications may be made therein without departing from the spirit of the invention or from the scope of the appended claims.

What I claim is:

1. The method of welding steel, using a welding rod of a steel of lower melting point than the base metal, which comprises heating the base metal to a temperature just below its melting point, thereafter causing molten metal from the welding rod to flow over the base metal and exclude the atmosphere from contact with the base metal in the region of the weld and melting the base metal after it has been covered with the molten metal from the welding rod.

2. The method of welding steel, using a welding rod of a steel of lower melting point than the base metal, which comprises heating the base metal, melting the welding rod and causing molten metal from the welding rod to flow over the base metal before the base metal is heated to the temperature at which it becomes plastic, whereby the molten metal of the welding rod will run into and fill crevices formed by distortion of the metallic grains of the base metal and will preclude air from entering such crevices and thus prevent burning of the base metal.

3. The method of welding a chrome molybdenum steel, using a welding rod of an austenitic steel of lower melting point than the chrome molybdenum steel, which comprises heating the chrome molybdenum steel to a temperature just below its melting point, thereafter causing molten austenitic steel from the welding rod to flow over the chrome molybdenum steel and exclude the atmosphere from contact with the chrome molybdenum steel in the region of the weld, and melting the chrome molybdenum steel after it has been covered with the molten austenitic steel.

4. The method of welding chrome molybdenum steel, using a welding rod of an austenitic steel of lower melting point than the chrome molybdenum steel, which comprises heating the chrome molybdenum steel, melting the welding rod and causing molten austenitic steel from the welding rod to flow over the chrome molybdenum steel before the chrome molybdenum steel is heated to the temperature at which it becomes plastic, whereby the molten austenitic steel will run into and fill crevices formed by distortion of the metallic grains of the chrome molybdenum steel and will preclude air from entering such crevices and thus prevent burning of the chrome molybdenum steel, and then melting the chrome molybdenum steel after it is covered with the molten austenitic steel.

5. The method of welding chrome molybdenum steel, using a welding rod of an austenitic steel of lower melting point than the chrome molybdenum steel, which comprises heating the chrome molybdenum steel to a temperature just below its melting point and causing molten austenitic steel from the welding rod to flow over the chrome molybdenum steel before the chrome molybdenum steel is heated to the temperature at which it becomes plastic, and then melting the chrome molybdenum steel after it has been covered with the molten austenitic steel.

PAUL D. FFIELD.